Nov. 24, 1964  J. H. RENTSCHLER  3,158,376
LOW PRESSURE SEAL
Filed May 10, 1963  2 Sheets-Sheet 1

INVENTOR.
JOHN H. RENTSCHLER
BY
Schroeder & Siegfried
ATTORNEYS

Nov. 24, 1964  J. H. RENTSCHLER  3,158,376
LOW PRESSURE SEAL
Filed May 10, 1963  2 Sheets-Sheet 2
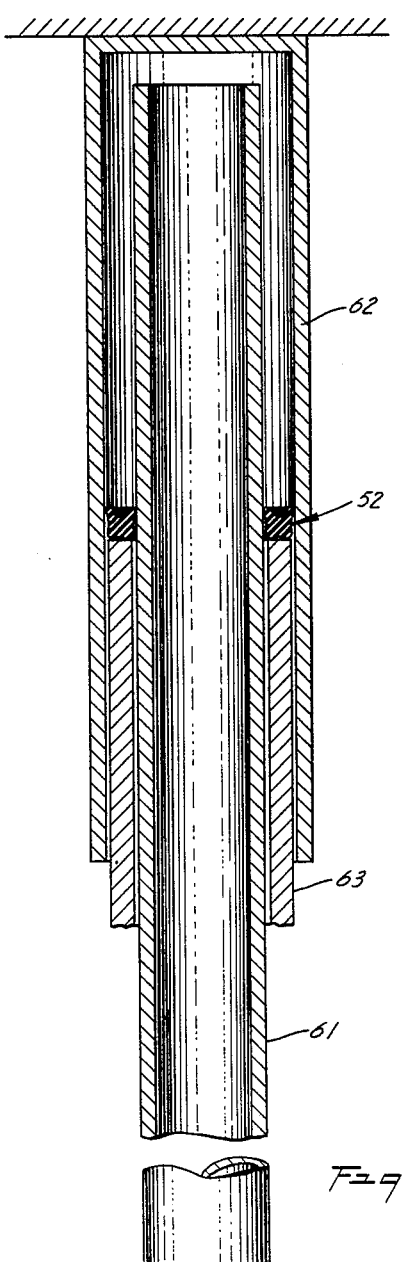
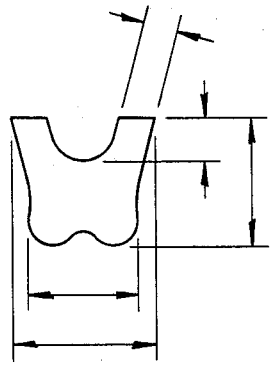
Fig. 8.
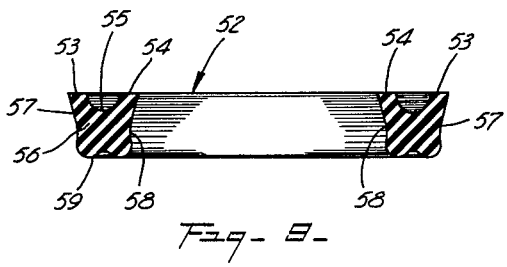
Fig. 9.
Fig. 10.
INVENTOR.
JOHN H. RENTSCHLER
BY
Schroeder & Siegfried
ATTORNEYS United States Patent Office 3,158,376
Patented Nov. 24, 1964

3,158,376
LOW PRESSURE SEAL
John H. Rentschler, Minneapolis, Minn., assignor to Minnesota Rubber Company, Minneapolis, Minn., a corporation of Minnesota
Filed May 10, 1963, Ser. No. 279,486
13 Claims. (Cl. 277—205)

This invention relates to sealing devices. More particularly, it relates to perfecting a seal between a pair of opposed surfaces at relatively low pressures by forming a groove in one of the surfaces and installing a sealing ring of unique cross-sectional configuration therein.

Under certain conditions it is desirable to perfect a seal between a pair of opposed surfaces which can be characterized as having low interference and a relatively small contact area to insure ease of relative movement between the two surfaces and under conditions where the pressure is applied from either or both sides of the seal. Under such circumstances, it is desirable that the seal be characterized by low friction, a long life at low pressures and a more positive seal than is normally provided by the conventional O-ring or other seal utilizing lobed sealing surfaces. In such circumstances it is also frequently highly desirable to provide a maximum wiping action. Since such circumstances frequently involve reciprocatory and/or rotary applications where the pressure is applied from either or both sides, it is frequently desirable that such maximum wiping action be provided inherently in the seal irrespective of the direction of motion between the two relatively moving opposed surfaces. The maximum wiping action is desirable in order to reduce to a minimum the thickness of the film which may have been left on the surface against which the seal is perfected. Also, under certain circumstances, it is desirable to have a seal capable of performing efficiently under these conditions at pressures which, although they are low, are relatively high and are particularly suitable for usages at pressures at such an intermediate level. This invention is directed toward providing a solution to these needs.

It is a general object of the invention to provide a novel and improved sealing device which is simple and inexpensive to manufacture, assemble, and utilize.

A more specific object is to provide a novel and improved seal having a unique cross-sectional configuration which provides low interference and will permit maximum freedom of movement between the surfaces between which the seal is to be perfected irrespective of the direction of motion between the two relatively movable opposed surfaces.

Another object is to provide a novel and improved seal having inherent sealing features due to its cross-sectional configuration which will provide an efficient wiping action upon the sealing surface along with low interference and a small contact or sealing area, all irrespective of the direction of motion between the two relatively movable surfaces.

Another object is to provide a novel and improved seal which provides a pressure actuated sealing lip at intermediate pressure which will yield an efficient wiping action upon the sealing surface together with low interference and small contact or sealing area.

Another object is to provide a novel and improved seal which provides a pressure actuated sealing device capable of providing an efficient low interference, small contact sealing area seal with good wiping action at relatively low pressures and of also adequately sealing satisfactorily at relatively high pressures irrespective of the direction of movement of the relatively movable surfaces between which the seal is to be perfected.

These and other objects and advantages of this invention will more fully appear from the following description, made in connection with the accompanying drawings, wherein like reference characters refer to the same or similar parts throughout the several views, and in which:

FIG. 8 is a cross-sectional outline view of a second form of the invention with the approximate proportions shown.

Figure 1:
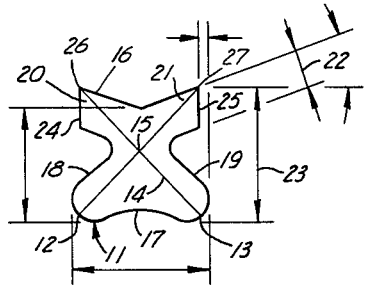
FIG. 1 is a cross-sectional outline of a section of the preferred embodiment of my invention with the approximate proportions shown.

FIG. 9 is a cross-sectional view of a sealing ring of the type shown in FIG. 8 and FIG. 10 is a fragmentary sectional view showing two opposed surfaces with an annular groove formed in one thereof and surrounding a central opening through which the pressure is applied, with a sealing ring of the type shown in FIGS. 8 and 9 mounted in the groove of one of the surfaces and perfecting a seal between the two surfaces.

The preferred form of the invention is illustrated in FIGS. 1–7, inclusive. As shown, it consists of a continuously formed ring-like member indicated generally by the numeral 11 which is formed of resilient flowable material such as rubber throughout. The ring 11 is adapted to be fitted into an annular groove of the type which is conventional and is frequently used in combination with rings of circular cross-section, commonly referred to as O-rings. The ring of this invention, however, is generally rectangular in cross-sectional configuration as can be readily seen by reference to FIGS. 1–7. It is characterized in its cross-sectional shape by a pair of adjacent convexly shaped lobes 12 and 13 at two of its corners which are, in usage, disposed at the bottom of the groove as clearly shown in FIGS. 3, 5, and 7. The ring 11 has a main body portion 14 and its generally rectangular configuration is best illustrated by reference to the cross-sectional center 15. As shown, the ring has a pair of axially spaced sides 16 and 17 and a pair of radially spaced sides 18 and 19. The side 18 represents the outer diameter of the ring and the side 19 represents the inner diameter of the ring in the particular form shown in FIGS. 1–3.

When the ring 11 is considered cross-sectionally, it is characterized by the presence of a pair of elongated cantilevered sealing elements 20 and 21. It will be noted that the two cantilevered sealing elements extend outwardly away from each other and are attached to the main body portion 14 at substantially the same point. It will also be noted that the two sealing elements 20 and 21 extend away from the main body portion at the same side 16 of the ring.

It will be noted that the two sealing elements 20 and 21 terminate inwardly of the lateral confines of the two lobes 12 and 13 and that their cantilevered construction is characterized by the fact that they are of substantially uniform thickness throughout substantially their entire length. It should be noted that the thickness of each of the sealing elements as viewed in FIG. 1 is approximately one-fourth of the dimensions of the main body portion 14 as can be determined by measuring the distance of the line identified by the numeral 22 and comparing the same to the length of the line identified by the numeral 23. It should also be noted that each of the sealing elements 20 and 21 is substantially longer than its thickness in that it extends a distance away from its point of attachment to the main body portion 14 greater than the thickness of the sealing element.

It will be noted that the side 17 which is bounded by the two lobes 12 and 13 and bears against the bottom of the groove has a concavity of relatively large radius. The two sealing elements 20 and 21 extend away from the side 16. The two sides 18 and 19 which are disposed between the sealing elements and the side that bears against the bottom of the groove are characterized by relatively deep concavities which have a sharp radius and the side 16 which is defined by the two sealing elements has a relatively shallow concavity. It will also be seen that the left hand side of the ring as viewed in FIG. 1 is formed symmetrically relative to the right hand side of the ring.

The two sealing elements 20 and 21 are each characterized by a flat end surface 24 and 25, respectivey, which extend parallel to each other and defines with the side 16 an angular sealing contact or lip 26, 27, respectively. These lips 26 and 27 when followed around the circumference of the ring provide two annular line contacts at which the seals are perfected. It will be seen that the two sealing elements 20 and 21 when so formed give the side of the ring away from the side 17 which is positioned at the bottom of the groove a general chevron shape.

Figure 2:
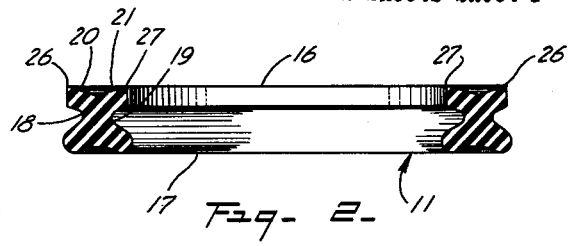
FIG. 2 is a cross-sectional view of one of the sealing rings of the invention designed for use as an internal face seal.
Figure 3:
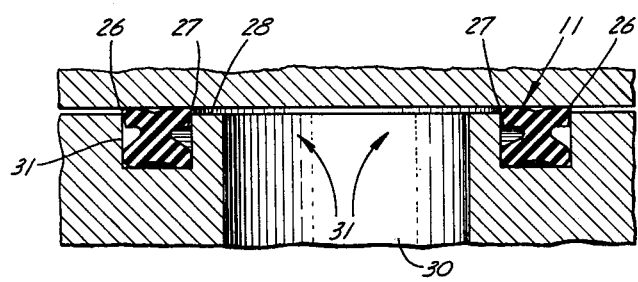
FIG. 3 is a fragmentary sectional view showing a pair of surfaces one of which has a sealing groove formed therein and containing the internal face seal of FIG. 2 to perfect a seal between the two surfaces and surrounding a central opening through which the pressure is applied.

The form of the ring shown in FIGS. 2 and 3 carries the sealing elements 20 and 21 at one of the axial sides of the ring. FIG. 3 shows such a ring utilized to provide a face seal between a pair of opposed surfaces 28 and 29. A centrally disposed opening 30 is formed through the surface 28 and is surrounded by an annular groove 31 within which the ring 11 is mounted. The direction of pressure is indicated by the arrow 31. The axial dimensions of the ring 11 in its free form are slightly greater than the depth of the groove plus the slight spacing between the surfaces 28 and 29 so that the sealing elements 20 and 21 are somewhat compressed and deformed as shown in FIG. 3. The two sealing contacts or lines 26 and 27 perfect a seal against the surface 29.

Figure 4:
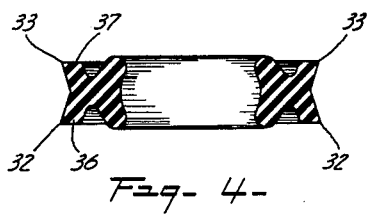
FIG. 4 is a cross-sectional view of the sealing ring of the invention designed for use as an external seal.
Figure 5:
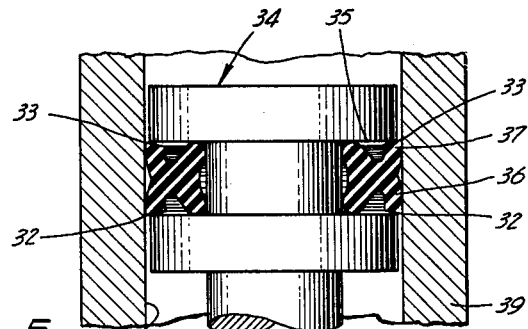
FIG. 5 is a fragmentary vertical sectional view of a cylinder assembly with a piston shown therein in elevation, the latter being shown with the external seal of FIG. 4 mounted in a groove thereof to perfect a seal between the piston and the cylinder wall.
Figure 6:
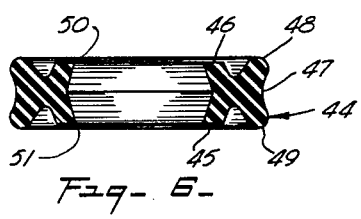
FIG. 6 is a cross-sectional view of a sealing ring designed in accordance with the invention for use as an internal seal.

In FIGS. 4 and 5 there is shown a form of the invention with the cantilevered sealing elements having line contacts 32 and 33 which perfect an external seal on a piston 34 having a groove 35 formed therein. The two line contacts 32 and 33 of the sealing elements 36 and 37, respectively, perfect a seal against the inner wall 38 of the cylinder 39.

Figure 7:
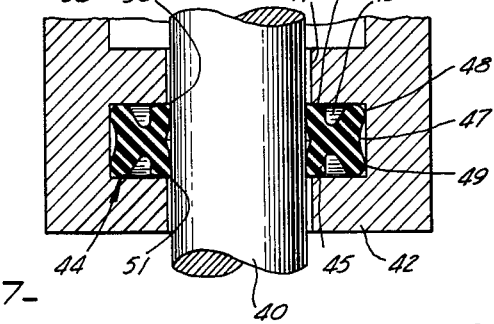
FIG. 7 is a fragmentary sectional view showing a shaft in elevation extending through an annular opening in a surrounding surface with the seal of FIG. 6 mounted in a groove formed therein to perfect a seal between the shaft and the grooved surface.

FIG. 7 shows a shaft 40 extending through an opening 41 of a wall 42, the latter having an annular groove 43 formed therein and facing the exterior surface of the shaft 40. This is an example of either a rotary seal or a reciprocatory application wherein the sealing ring 44 has cantilevered sealing elements 45 and 46 extending radially inwardly from its inner surface. In this form of the invention the outer diameter surface 47 carries the two lobes 48 and 49 and lies within the bottom of the groove 43 while the sealing lips 50 and 51 bear against the shaft 40. In this application, as in each of the applications, the dimensions of the ring are such that when the ring is placed within the groove the sealing elements are somewhat compressed so that the cantilever support of the sealing elements comes into play to hold the line contacts of the angular sealing element against the surface along which the seal is to be perfected. Reference to FIG. 7 will show how the sealing lips 50 and 51 are urged toward the bottom of the groove 43 slightly so that the cantilevered support of these elements will be brought into play to perfect the seal at low pressures and maintain the same irrespective of the direction of movement between the surfaces between which the seal is to be formed.

FIGS. 8–10 illustrate a second form of the invention wherein a sealing ring indicated generally by the numeral 52 is designed particularly for usage in applications where the pressure to be applied is at the higher levels of the low pressure range. As shown, this sealing ring 52 has a pair of cantilevered sealing elements 53 and 54 which extend axially away from one of the sides 55. These cantilevered sealing elements 53 and 54 extend at an acute angle to each other away from the main generally rectangularly shaped body portion 56 of the ring. Opposed radial sides 57 and 58 extend between the sealing elements 53 and 54 and the opposite axial side 59. It will be noted that the axial side 59 which is designed to fit into the bottom of the groove is slightly concave whereas the opposite axial side 55 is sharply concaved. It will also be noted that the radial sides 57 and 58 have a substantially flat straight surface which design gives the cantilevered sealing elements 53 and 54 greater strength and makes them more suitable for maintaining a seal at the higher levels of the low pressure ranges.

The seal 52 is designated for usage in situations such as is shown in FIG. 10 wherein a source of fluid pressure indicated generally by the numeral 60 is applied to the interior of a tubular member 61, one end of which is received within a hollow cylinder 62. The ring 52 extends around the tubular member 61 and perfects a seal between the external surface thereof and the interior surface of the cylinder 62 to move a sleeve member 63 which surrounds the tubular member 61.

It will be noted that in each form of the invention I have provided a pair of cantilevered sealing elements at one side of the sealing device which, when considered together, are generally chevron-shaped and that the opposite side is characterized by its convexly lobed corners.

From the above it can be seen that I have provided novel and improved seals uniquely designed to provide low interference and maximum freedom of movement between the surfaces between which the seal is to be perfected when low pressures are utilized. This improved seal performs in an improved manner irrespective of the direction of motion between the two relatively movable opposed surfaces. Moreover, the seal is simple and inexpensive to manufacture, assemble, and utilize.

It will also be noted that the cantilevered sealing elements of my invention provide an efficient wiping action upon the sealing surface along with low interference and a small contact of sealing area. These features are provided irrespective of the direction of motion between the two relatively movable surfaces. Moreover, when it becomes necessary to operate at the higher levels of the low pressure ranges, the cantilevered sealing elements perform in an improved manner over those heretofore known. Low pressures, when used generally, is intended to refer to pressures in the range below approximately 500 p.s.i.

It will, of course, be understood that various changes may be made in the form, details, arrangement and proportions of the parts without departing from the scope of this invention which consists of the matter shown and described herein and set forth in the appended claims.

What is claimed is:

1. A sealing device comprising a continuously formed ring-like member made of a resilient flowable material such as rubber throughout and adapted to be fitted into a sealing groove of ring-like configuration, said ring-like member in its free form having a main body portion which is generally rectangular in cross-sectional configuration, said member having a pair of axially spaced sides and a pair of radially spaced sides and, when considered cross-sectionally, having a pair of elongated cantilevered sealing elements projecting outwardly from its said main body portion at one of its sides at adjacent corners of the rectangular cross-sectional configuration and having convexly shaped lobes at its remaining corners.

2. The structure defined in claim 1 wherein said sealing elements are of uniform thickness throughout substantially their entire length.

3. The structure defined in claim 1 wherein said elongated sealing elements have a thickness approximating one-fourth of the overall cross-sectional dimensions of the outer confines of said main body portion.

4. The structure defined in claim 1 wherein said sealing elements extend a distance away from said main body portion greater than the thickness of said sealing elements.

5. The structure set forth in claim 1 wherein said sealing elements extend outwardly away from each other.

6. The structure defined in claim 1 wherein said sealing elements have a thickness approximating one-fourth of the overall cross-sectional dimensions of the outer confines of said main body portion and each extends a distance away from said main body portion greater than the thickness of said sealing elements.

7. The structure set forth in claim 1 wherein said sealing elements extend away from said main body portion in different directions and at an obtuse angle to each other.

8. The structure defined in claim 1 wherein each of said sealing elements carries an angular sealing surface at its outer extremity.

9. The structure defined in claim 1 wherein at least one of said sides is concavely shaped when considered cross-sectionally.

10. A sealing device comprising a continuously formed ring-like member made of a resilient flowable material such as rubber throughout and adapted to be fitted into a sealing groove of ring-like configuration, said ring-like member in its free form having a main body portion which is generally rectangular in cross-sectional configuration, said member having a pair of axially spaced sides and a pair of radially spaced sides and, when considered cross-sectionally, having a pair of elongated cantilevered sealing elements projecting outwardly from its said main body potrion at one of its sides, each of said sides being concavely shaped in cross-sectional configuration and the two sides adjacent the sides from which said sealing elements extend being more deeply concaved than the other sides of said member.

11. A sealing device comprising a continuously formed ring-like member made of a resilient flowable material such as rubber throughout and adapted to be fitted into a sealing groove of ring-like configuration, said ring-like member in its free form having a main body portion which is generally rectangular in cross-sectional configuration, said member having a pair of axially spaced sides and a pair of radially spaced sides and, when considered cross-sectionally, having a pair of elongated cantilevered sealing elements projecting outwardly from its said main body portion at one of its sides, each of said sides being concavely shaped and the two sides adjacent the sides from which said sealing elements extend being less deeply concaved than the other sides of said member.

12. A sealing device comprising a continuously formed ring-like member made of a resilient flowable material such as rubber throughout and adapted to be fitted into a sealing groove of ring-like configuration, said ring-like member in its free form having a main body portion which is generally rectangular in cross-sectional configuration, said member having a pair of axially spaced sides and a pair of radially spaced sides and, when considered cross-sectionally, having a pair of elongated cantilevered sealing elements projecting outwardly from its said main body portion at one of its sides, the side from which said sealing elements extend being deeply concaved and the two sides adjacent the sides from which said sealing elements extend having relatively shallow concavities.

13. A sealing device comprising a continuously formed ring-like member made of a resilient flowable material such as rubber throughout and adapted to be fitted into a sealing groove of ring-like configuration, said ring-like member in its free form having a main body portion which is generally rectangular in cross-sectional configuration, said member having a pair of axially spaced sides and a pair of radially spaced sides and, when considered cross-sectionally, having a pair of elongated cantilevered sealing elements projecting outwardly from its said main body portion at one of its sides and defining a chevron-shaped configuration thereat and having convexly lobed corners at its opposite side.

References Cited by the Examiner
UNITED STATES PATENTS

| | | | |
|---|---|---|---|
| 1,770,193 | 7/30 | Bragg et al. | 277—205 X |
| 2,873,132 | 2/59 | Tanner | 277—209 |
| 3,007,723 | 11/61 | Clarke | 277—205 |

EDWARD V. BENHAM, *Primary Examiner.*